June 17, 1952          D. ORTLEB          2,601,052

PROTECTOR PAD AND ARMREST FOR AUTOMOBILE WINDOWS

Filed Sept. 4, 1948

ATTORNEY
DOUGLAS ORTLEB
BY
ATTORNEY

Patented June 17, 1952

2,601,052

UNITED STATES PATENT OFFICE 2,601,052

PROTECTOR PAD AND ARMREST FOR AUTOMOBILE WINDOWS

Douglas Ortleb, St. Louis, Mo.

Application September 4, 1948, Serial No. 47,815

1 Claim. (Cl. 296—49.2)

This invention relates to protector pads particularly those intended for use at the window of an automobile. The driver of the vehicle frequently rests his left arm on the window frame, which is uncomfortable, and the object of the present invention is to provide a pad which can be secured to the frame so that his arm will rest on the pad, and the pad is secured in such a way that it may remain in place when the window is closed, and without further adjustment will permit up or down movement of the window glass. The pad may equally well be used in other windows of an automobile.

My protector pad is preferably made of any waterproof material, and among its other advantages are its simplicity, permitting inexpensive production, and the fact that when positioned for use it cannot be accidentally displaced.

In the drawings—

Figure 1:
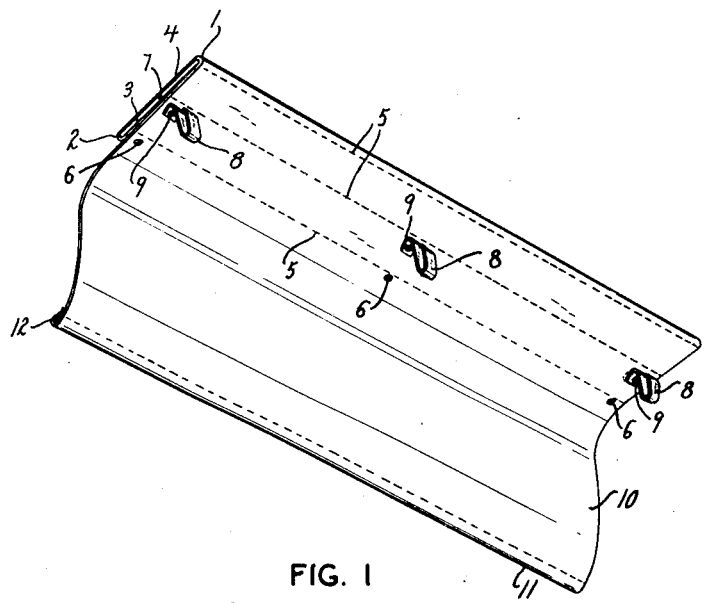
Fig. 1 is a perspective view of the underside of my protector pad.

The invention comprises a section of fabric of approximately the same width as the window frame in which it is to be used. The fabric is longitudinally folded upon itself as at 1, and at a distance from the fold 1 equal approximately to the depth of the window frame it is folded under, as at 2, so that the raw edge 3 will be invisible (Fig. 1). As is obvious, the above folds form a casing into which a stiffening member 4, preferably of heavy cardboard, is inserted, the stiffening member being of approximately the same dimension as the casing. The stiffening member 4 and the fabric of the casing are then sewed together by several rows of stitching 5, and to further secure these parts together rivets 6 are driven through the fabric and the stiffening member.

At its longitudinal center the stiffening member 4 is scored, as at 7, to facilitate longitudinal bending thereof, and a plurality of spring metal hooks 8 are secured to the underside of the casing near the scored line 7 by rivets 9, which extend through said casing and through the stiffening member 4. The remaining portion 10 of the fabric section which does not constitute a part of the casing for the stiffening member 4 is allowed to hang loose, and is provided at its free longitudinal edge with a narrow hem 11 into which a rod 12 is inserted to act as a weight.

Figures 2, 3:
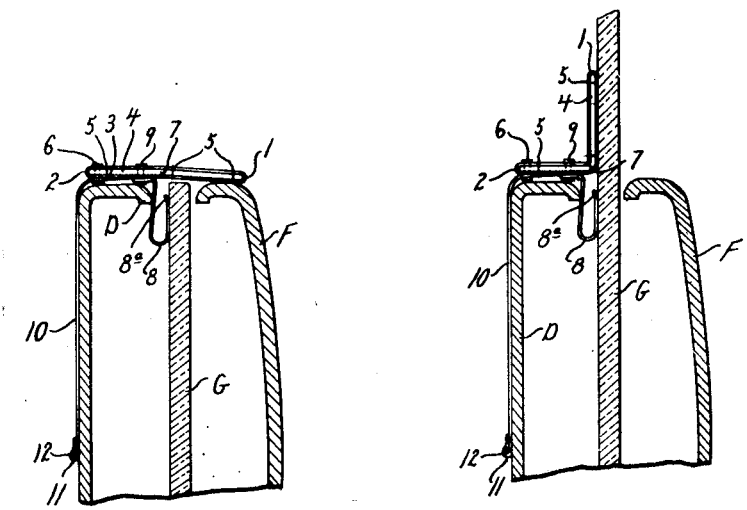
Fig. 2 is an enlarged side elevation illustrating the pad as it appears in position on the window frame of an automobile with the glass down.
Fig. 3 is a view similar to Fig. 2, but showing the pad as it appears with the glass of the window in raised position.

In operation the procedure is as follows:

With the glass of the automobile window down to its lowermost position, the resilient hooks 8 are pushed down between the glass G and the adjacent portion of the door D in the position shown in Fig. 2, where they are securely held by frictional engagement with these parts. The stiffening member in its casing extends horizontally across and rests upon the portion D of the door, above the glass G, and comes to rest upon the window frame F, with the scored line 7 slightly to one side of the glass. The fabric section 10 hangs loosely against the inner side of the door, the weight of the rod 12 serving to keep this section from swinging with the motion of the car, or being blown out through the window by the breeze. The pad is now in the position shown in Fig. 2, and while the procedure has just been described as related to the window in the door of the automobile, it is understood that a similar procedure would be applicable to the other car windows.

Now supposing with the protector pad in the position just described it is desired to close the automobile window. As the glass G is raised, it pushes up on the stiffening member 4 in its casing. By virtue of the scored line 7, this upward movement of the glass causes that portion of the stiffening member which lies between the fold 1 and the scored line 7 to assume an upright position against the surface of the glass G, the frictional engagement of the hooks 8 at the same time preventing the pad from being displaced from its position in the window frame, even though the glass G is raised to its full height. With the glass in raised position, the parts remain as illustrated in Fig. 3.

When the glass is again brought to its lowermost position to open the window, it will be understood that the upright portion of the stiffening member 4 drops by gravity back to the position it occupies in Fig. 2. The slight bend 8ª at the free end of each of the hooks 8 keeps the hooks from scratching the glass when being moved up or down.

I claim:

An integrally formed protector pad for use in an automobile window or the like, comprising a section of material folded and secured to provide a casing, a stiffening member secured within said casing, said encased stiffening member being adapted to be positioned on the frame of said window to provide a protector pad for the arm of an occupant of the automobile, and resilient retaining means secured on the underside of said stiffening member for insertion between the frame and glass of said window and adapted to secure said pad in position by frictional engagement against dislodgement upon vertical movement of said glass, said stiffening member being provided with a scored line to permit a portion thereof to rest against the surface of said glass when said glass is in raised position.

DOUGLAS ORTLEB.

REFERENCES CITED

The following references are of record in the file of this patent:

UNITED STATES PATENTS

| Number | Name | Date |
|---|---|---|
| 1,929,590 | Krentler | Oct. 10, 1933 |
| 1,962,508 | Josselyn | June 12, 1934 |
| 2,274,026 | Allen | Feb. 24, 1942 |
| 2,345,004 | Place | Mar. 28, 1944 |
| 2,462,768 | Ortleb | Feb. 22, 1949 |